United States Patent [19]

Taya et al.

[11] Patent Number: 5,051,650
[45] Date of Patent: Sep. 24, 1991

[54] ULTRAVIOLET-SUPPRESSED LIGHT SOURCE, COATING AGENT USED IN THE SAME, AND METHOD FOR MANUFACTURING THE SAME

[75] Inventors: Akira Taya, Kawasaki; Keiji Hatakeyama, Yokohama; Kanehiro Saito, Chiba; Mitsumasa Saito; Kazuhiko Osada, both of Narashino, all of Japan

[73] Assignees: Kabushiki Kaisha Toshiba, Kawasaki; Sumitomo Cement Co., Ltd., Tokyo, both of Japan

[21] Appl. No.: 480,127

[22] Filed: Feb. 14, 1990

[30] Foreign Application Priority Data

Feb. 17, 1989 [JP] Japan ................................. 1-37686

[51] Int. Cl.$^5$ ........................... H01J 5/16; H01J 61/40
[52] U.S. Cl. ..................................... 313/112; 313/489; 313/493; 313/635; 427/126.2; 427/126.3
[58] Field of Search ................ 313/67, 112, 489, 493, 313/635; 427/65, 71, 126.2, 126.3; 428/213, 328, 432

[56] References Cited

U.S. PATENT DOCUMENTS

| | | | |
|---|---|---|---|
| 2,774,903 | 12/1956 | Burns | 313/489 |
| 3,531,677 | 9/1970 | Loughridge | 313/112 |
| 3,676,729 | 7/1972 | Menelly | 313/489 |

Primary Examiner—Donald J. Yusko
Assistant Examiner—Diab Hamadi
Attorney, Agent, or Firm—Oblon, Spivak, McClelland, Maier & Neustadt

[57] ABSTRACT

A film consisting of a fine powder of zinc oxide and titanium oxide and an inorganic binder is formed on the outer surface of a light source. The fine powder serves as an absorbent for ultraviolet radiation emitted from the light source. The film is formed on the outer surface by spraying a coating agent prepared by dispersing the above components in an organic solvent on the outer surface of the light source and heating and drying the coating agent.

23 Claims, 3 Drawing Sheets

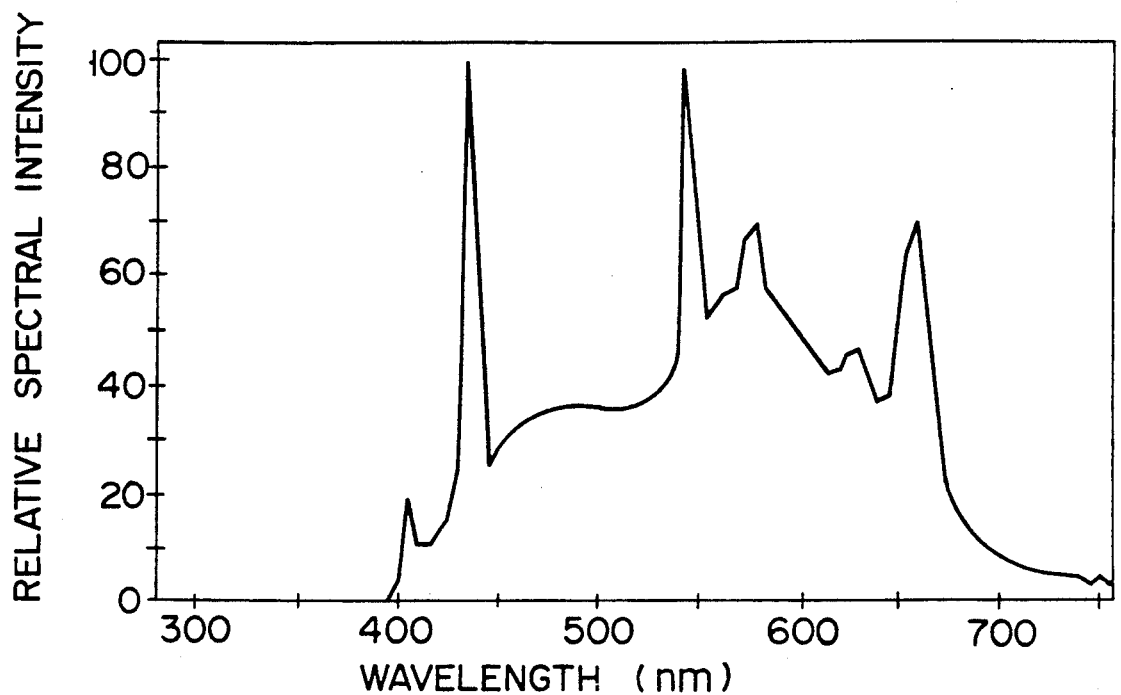
F I G. 1
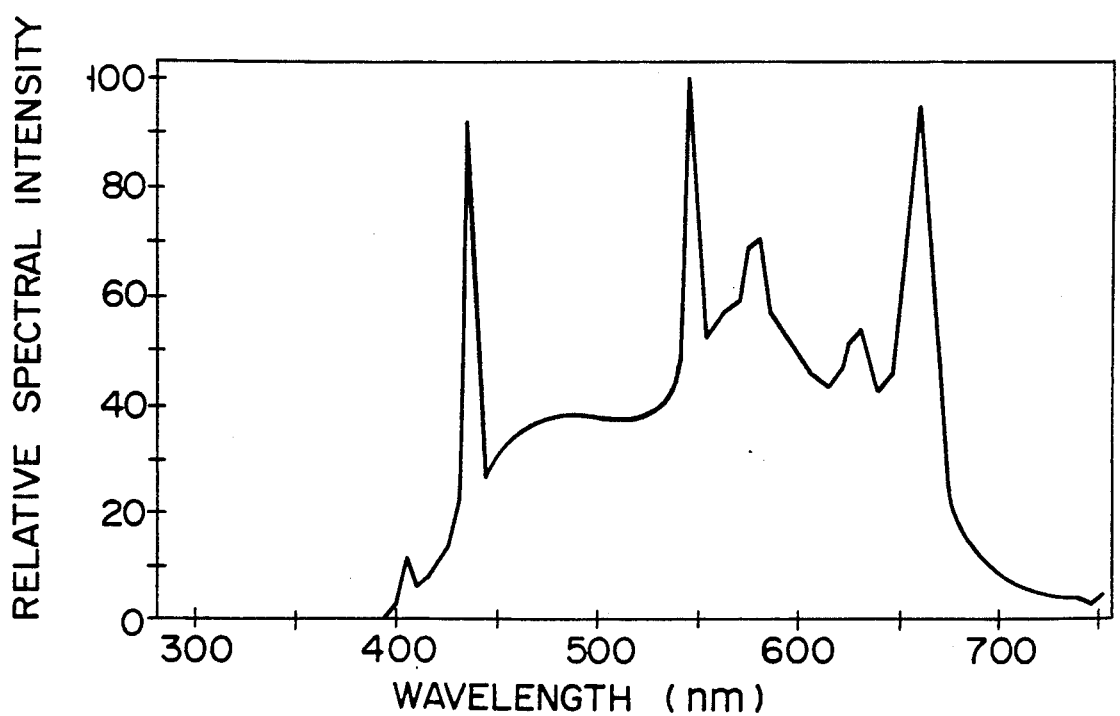
F I G. 2

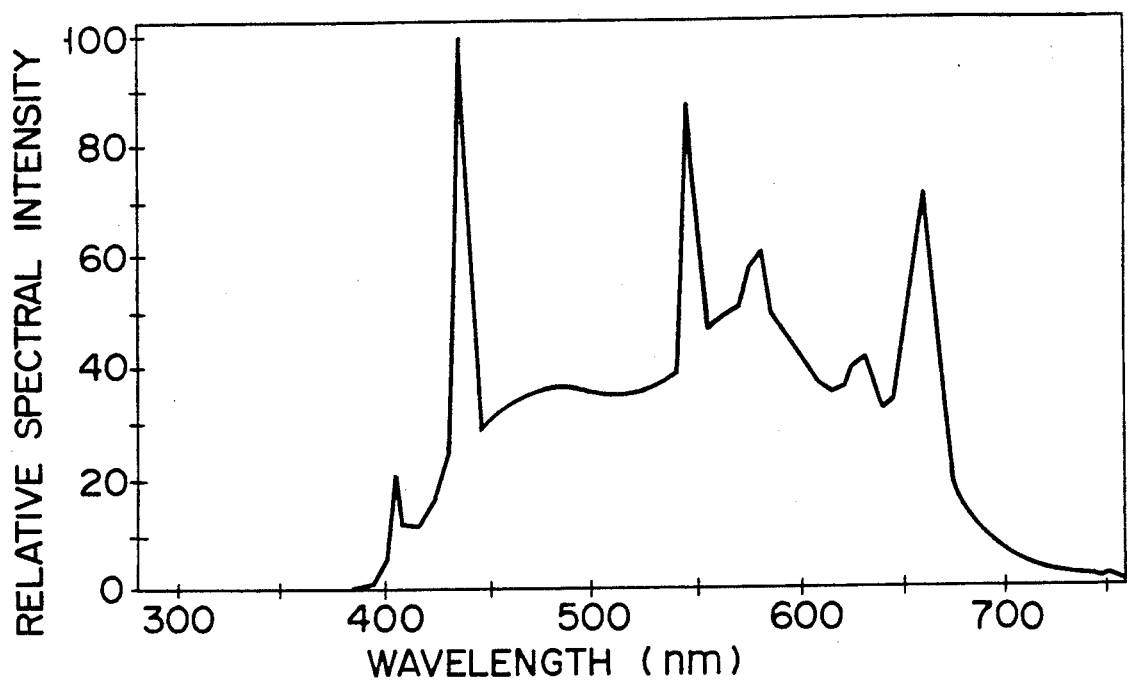
F I G. 5
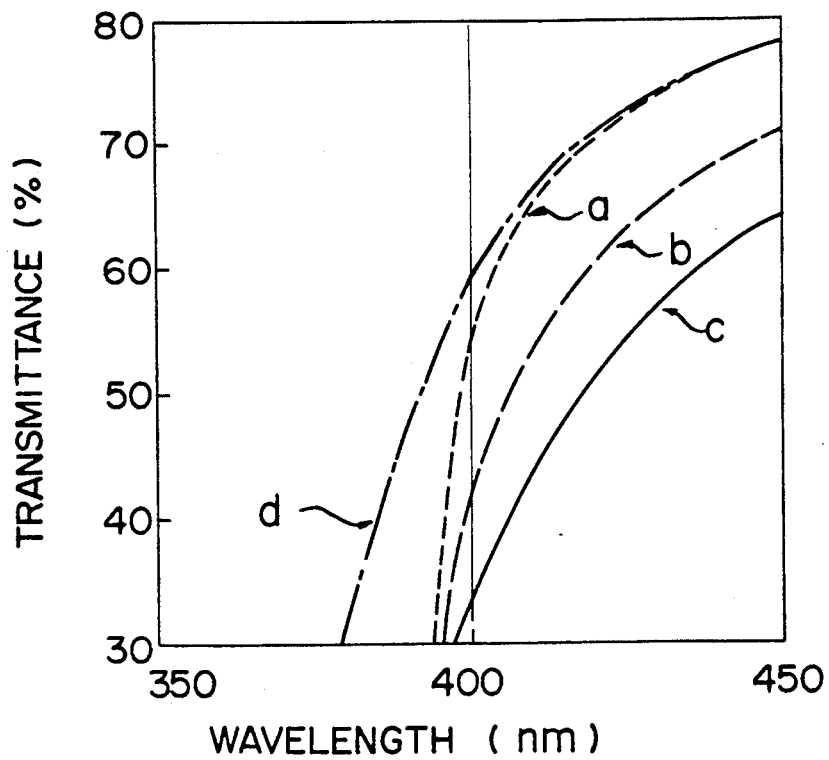
F I G. 6

ULTRAVIOLET-SUPPRESSED LIGHT SOURCE, COATING AGENT USED IN THE SAME, AND METHOD FOR MANUFACTURING THE SAME

BACKGROUND OF THE INVENTION

1. Field of the Invention

The present invention relates to a light source such as a fluorescent lamp or a halogen lamp which emits ultraviolet-radiation suppressed light, a coating agent for use in the light source, and a method of manufacturing the light source.

2. Description of the Related Art

A fading-suppressing fluorescent lamp (NU lamp) is conventionally used as an illumination light source for museum in which care must be taken to prevent fading of places such as a department store, an art gallery, and a products or exhibits.

The NU lamp has a structure in which two layers of a 5- to 10-$\mu$m thick film containing titanium oxide ($TiO_2$) having a grain size of 0.2 to 0.3 $\mu$m and a 30- to 50-$\mu$m thick film consisting of a fluorescent substance are sequentially formed on the inner surface of a glass tube. The titanium oxide film has an effect of absorbing ultraviolet radiation of 400 nm or less which is a cause of fading.

This NU lamp, however, has the following drawbacks as compared with a lamp of the same type not having a film containing titanium oxide.

(1) In order to obtain sufficient ultraviolet absorptive power, the film thickness of the film containing titanium oxide must be increased to increase the content of titanium oxide. As a result, a luminous flux of the NU lamp is reduced by 5% to 10% as compared with that of a normal lamp.

(2) Since titanium oxide absorbs ultraviolet radiation and visible light, especially blue light, the light color of the NU lamp is different from that of a normal lamp.

(3) In relation to the item (2), the color rendering property of the NU lamp is low.

(4) Since a high-temperature process at about 600° C. must be performed twice in order to form a film having the two-layered structure described above, manufacturing steps of the NU lamp are complicated. In addition, the strength of a glass tube is reduced after the two high-temperature processes.

Published Unexamined Japanese Patent Application No. 61-110959 proposes an NU fluorescent lamp manufactured by forming a coating layer consisting of a solvent-soluble fluorine-containing polymer containing an ultraviolet absorbent on the outer surface of a glass tube. In this lamp, an organic compound such as a benzotriazole-based compound is used as the ultraviolet absorbent.

In this NU fluorescent lamp, however, a temperature for baking the fluorine-containing polymer on the outer surface of the glass tube is high, and the film thickness of the coating layer must be as large as about 10 to 30 $\mu$m in order to obtain sufficient ultraviolet absorptive power.

Although a fluorescent lamp has been described above, even a halogen lamp or an HID (high-intensity discharge) lamp is often required to suppress ultraviolet radiation. As for these lamps, however, no suitable conventional means which can effectively suppress ultraviolet radiation and can withstand a high operation temperature of the lamp for a long time period have been provided.

SUMMARY OF THE INVENTION

It is, therefore, an object of the present invention to provide an ultraviolet-suppressed light source which has a high ultraviolet suppressing effect, a high luminous flux, a constant light color, and a good color rendering property, and which can be easily manufactured.

It is another object of the present invention to provide a coating agent for the light source.

It is still another object of the present invention to provide a method of manufacturing the light source.

The ultraviolet-suppressed light source of the present invention is characterized in that a film consisting of a fine powder of zinc oxide and titanium oxide and a binder is formed on the outer surface of a glass tube constituting the light source.

The ultraviolet-suppressed light source coating agent of the present invention is characterized in that a fine powder of zinc oxide and titanium oxide and a binder are dispersed in a solvent.

The method of manufacturing the ultraviolet-suppressed light source of the present invention is characterized in that the coating agent is coated and dried on the outer surface of a glass tube constituting the light source.

The present invention can be applied to not only a fluorescent lamp but also a lamp used at a high temperature such as a halogen lamp or an HID lamp. Since the film according to the present invention has a high ultraviolet suppressing function obtained by a combination of the fine powder of zinc oxide and titanium oxide and the binder, a sufficient suppressing effect can be obtained by a thin layer. Therefore, a high luminous flux can be obtained from the light source of the present invention, and its color rendering property can be sufficiently maintained.

In addition, the light source of the present invention can be easily manufactured since the film is formed on the outer surface of a glass tube. In the manufacture of the light source according to the present invention, since the two high-temperature processes need not be performed unlike in the manufacture of a conventional lamp, a manufacturing time can be reduced and reduction in the glass tube strength can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 1 is a graph showing a spectral energy distribution of a fluorescent lamp according to Example 1 of the present invention;

FIG. 2 is a graph showing a spectral energy distribution of a fluorescent lamp according to Example 3 of the present invention;

FIG. 5 is a graph showing a spectral energy distribution of a fluorescent lamp according to Comparative Example 2 in which a film containing TiO$_2$ is formed on the inner surface of a glass tube; and FIG. 6 is a graph showing transmittance of ultraviolet radiation and visible light near a wavelength of 400 nm of four types of test pieces in which films having different mixing ratios between zinc oxide and titanium oxide are formed on glass plates.

Detailed Description of the Preferred Embodiments

Figure 3:
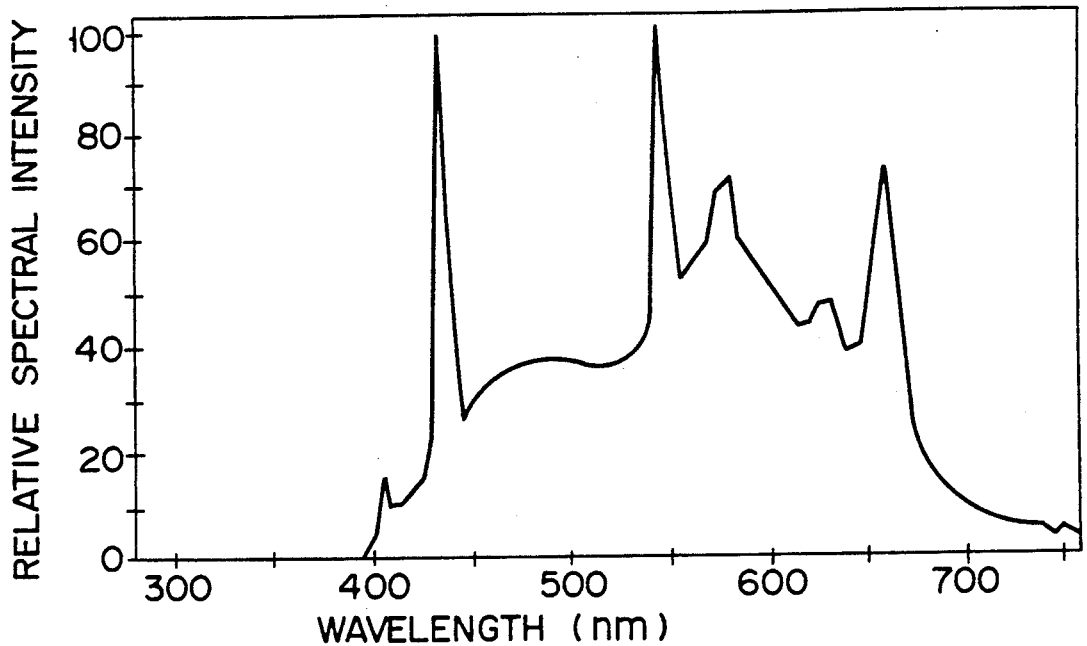
FIG. 3 is a graph showing a spectral energy distribution of a fluorescent lamp according to Example 5 of the present invention.

In the present invention, a film formed on the outer surface of a glass tube consists of a fine powder of zinc oxide and titanium oxide and a binder. This film is transparent.

In the present invention, the fine powder of zinc oxide and titanium oxide contained in the film serves as an ultraviolet absorbent. The grain size of the fine powder is preferably 0.1 μm or less. If the grain size of the fine powder exceeds 0.1 μm, its ultraviolet absorptive power and visible light transmittance are reduced.

Note that in the present invention, a fine powder of cerium oxide or iron oxide can be arbitrarily used in addition to the fine powder of zinc oxide and titanium oxide.

In the present invention, the binder constituting the film must have the following properties. That is, the binder must not be easily degraded by ultraviolet radiation, must transmit visible light, and must have high adhesion strength with respect to a glass tube, high film strength, a good film formation property, and a good dry property. Examples of the binder having these properties are a butyral resin; an acrylic resin; a fluorine resin; a silicone resin; an alkali silicate such as soda silicate; an inorganic colloid such as silica sol or alumina sol; an alkyl silicate such as tetraethoxysilane; a phosphate such as aluminum phosphate; an organice metal compound such as a metal alkoxide, aluminum chelate, or tin acetate. Especially when a light source generates a lot of heat such as an HID lamp, the above resins except for the butyral resin, the acrylic resin, and the fluorine resin are preferably used in terms of a heat resistance.

In the present invention, a mixing ratio of the fine powder (ultraviolet absorbent) to the binder as components of the film is generally 10 to 900 parts by weight, and more preferably, 25 to 250 parts by weight, and most preferably 50 to 150 parts by weight with respect to 100 parts by weight of the binder. If the amount of the fine powder is smaller than the above range, no sufficient ultraviolet absorptive power can be obtained. Therefore, the film thickness of the film must be increased. On the contrary, if the amount of the fine powder is larger than the above range, the adhesion strength of the film with respect to the glass tube is reduced to reduce the strength of the film. In addition, the transmittance for visible light is reduced.

In the present invention, the film thickness of the film is generally 0.1 to 100 μm, preferably, 0.5 to 30 μm, and more preferably, 1 to 15 μm. If the film thickness of the film is smaller than 0.1 μm, its ultraviolet absorptive power is reduced, and pin holes are easily formed in the film. On the contrary, if the film thickness of the film is larger than 100 μm, its visible light transmittance is reduced, and the adhesion strength of the film with respect to the glass tube is degraded.

In the present invention, the coating agent contains the above fine powder, the binder, and a solvent as main components. Any solvent may be used to constitute the coating agent as long as the solvent dissolves the binder. The boiling point of the solvent, however, is preferably 60° C. to 200° C. so that the solvent can be dried at a low temperature. Examples of the solvent are an aromatic hydrocarbon such as xylene or toluene; an alcohol such as isopropylalcohol or n-butanol; an ester such as butyl acetate; a ketone such as methyl isobutyl ketone; a glycol ether such as ethylcellosolve; and a saturated hydrocarbon such as n-hexane, ligroin, or mineral spirit. It is a matter of course that some solvents can be dried at room temperature to form the film. Since the temperature of an HID lamp rises up to about 300° C. in an ON test, a solvent which evaporates with this heat may be used.

In the present invention, the coating agent may contain small amounts of a surface treating agent, a dispersing agent, a lubricant, a drying agent, an antifoaming agent, a hardening agent, and the like as needed in addition to the fine powder, the binder, and the solvent.

The ultraviolet-suppressed light source of the present invention can be manufactured by, e.g., the following method. That is, a light source such as a fluorescent lamp is manufactured by a conventional method in which a film containing a fluorescent substance is formed on the inner surface of a glass tube, electrodes are mounted, and a gas is sealed. The coating agent is coated on the outer surface of the glass tube and heated to evaporate and dry the solvent, thereby performing a hardening treatment such as baking.

The coating agent can be coated by any method as long as it is uniformly coated. Examples of the coating method are a brushing method, a spraying method, a dipping method, and a curtain flow coating method. Since the viscosity of the coating agent changes in accordance with a coating method, it is adjusted by using a suitable amount of a solvent.

The thin, transparent film is formed on the outer surface of the glass tube by the above method. In order to improve the gloss, the strength, and the surface hardness of the film, an overcoating layer is sometimes formed on the film as needed.

In the light source of the present invention, since the grain size of the ultraviolet absorbent, i.e., the fine powder of zinc oxide and titanium oxide contained in the film formed on the outer surface of the glass tube is as very small as 0.1 μm or less, the film can be made very thin. In addition, the film has sufficient ultraviolet absorptive power although its film thickness is very small. For example, identical ultraviolet absorptive power can be obtained when the film thickness of the film of the lamp according to the present invention is 1/10 that of a lamp manufactured by forming a film consisting of a fluorine-containing polymer containing an ultraviolet absorbent on the outer surface of a glass tube. That is, since the film thickness of the film is small, the luminous flux of the light source is not reduced. In addition, the light color and color rendering property of the light source are not adversely affected even if the film is formed. Furthermore, a material cost required to form the film is low.

The light source of the present invention can be easily manufactured since a baking temperature for forming the film is lower than that used to form a film containing titanium oxide on the inner surface of a glass tube or that used to form a film consisting of a fluorine-containing polymer containing an ultraviolet absorbent on the outer surface of a glass tube. Therefore, a cost required for a manufacturing installation is also low. In addition, a low baking temperature prevents degradation in strength of the glass tube, and the film also serves as a protective film for the glass tube. Therefore, the strength of the glass tube can be maintained.

The ultraviolet absorbent contained in the film for use in the light source of the present invention is an inorganic material having a high heat resistance. Therefore, the present invention can be similarly applied to a halogen lamp or an HID lamp having a high operation temperature in addition to the fluorescent lamp.

Examples according to the present invention will be described below.

EXAMPLE 1

100 parts by weight of tetraethoxysilane, 100 parts by weight of isopropylalcohol, and 35 parts by weight of 0.1-N hydrochloric acid were mixed and stirred at 60° C. for two hours to cause a reaction, thereby hydrolyzing tetraethoxysilane. Thereafter, 245 parts by weight of isopropylalcohol were added to the resultant mixture to prepare a tetraethoxysilane hydrolytic solution. The prepared solution was used as a binder solution. 4.5 parts by weight of fine zinc oxide grains (available from Sumitomo Cement Co., Ltd.) having a grain size of 0.03 $\mu$m and 0.5 parts by weight of fine titanium oxide grains (rutile: available from Sumitomo Cement Co., Ltd.) having a grain size of 0.03 $\mu$m were mixed in 100 parts by weight of the binder solution, and the resultant mixture was dispersed in a ball mill for 100 hours, thereby preparing a coating agent. At this time, a mixing ratio of the fine grains to the binder was selected to be 80 parts by weight of the fine grains with respect to 100 parts by weight of the binder. The prepared coating agent was sprayed on the outer surface of a glass tube of a fluorescent lamp (FL20S.N-SDL: available from TOSHIBA CORP.) and dried at 100° C. for 10 minutes, thereby forming a 2-$\mu$m thick transparent film.

EXAMPLE 2

A 2-$\mu$m thick transparent film was formed on the outer surface of a glass tube of a fluorescent lamp following the same procedures as in Example 1 except that 3 parts by weight of fine zinc oxide grains and 3 parts by weight of fine titanium oxide grains were used. At this time, a mixing ratio of the fine grains to the binder was selected to be 95 parts by weight of the fine grains with respect to 100 parts by weight of the binder.

EXAMPLE 3

A 2-$\mu$m thick transparent film was formed on the outer surface of a glass tube of a fluorescent lamp following the same procedures as in Example 1 except that two parts by weight of fine zinc oxide grains and four parts by weight of fine titanium oxide grains were used. At this time, a mixing ratio of the fin grains to the binder was selected to be 95 parts by weight of the fine grains with respect to 100 parts by weight of the binder.

EXAMPLE 4

Ammonia was added to the tetraethoxysilane hydrolytic solution used as the binder in Example 1 to adjust a pH of the solution to be 7, and the resultant mixture was stirred under reflux at 170° C. and reacted for two hours. Thereafter, toluene was added to the resultant solution, and the resultant mixture was distilled at a reduced pressure to prepare a binder solution having a solid content of 40%. 25 parts by weight of fine zinc oxide grains, 5 parts by weight of fine titanium oxide grains, 100 parts by weight of n-butanol, and 120 parts by weight of butyl acetate were mixed in 100 parts by weight of the binder solution, and the resultant mixture was dispersed by a sand grinder for 30 minutes, thereby preparing a coating agent. At this time, a mixing ratio of the fine grains to the binder was selected to be 75 parts by weight of the fine grains with respect to 100 parts by weight of the binder. The resultant coating agent was sprayed on the outer surface of a glass tube of a fluorescent lamp (FL20S.N-SDL) and dried at 120° C. for five minutes, thereby forming a 3-$\mu$m thick transparent film.

EXAMPLE 5

100 parts by weight of silicone varnish (nonvolatile content=50%), 25 parts by weight of fine zinc oxide grains, 25 parts by weight of fine titanium oxide grains, and 350 parts by weight of toluene were mixed and dispersed by a sand grinder for 30 minutes, and 20 parts by weight of isocyanate were added as a hardening agent to the resultant mixture, thereby preparing a coating agent. At this time, a mixing ratio of the fine grains to the binder was selected to be 100 parts by weight of the fine grains with respect to 100 parts by weight of the binder. The prepared coating agent was sprayed on the outer surface of a glass tube of a fluorescent lamp (FL20S.N-SDL) and dried at 60° C. for 30 minutes, thereby forming a 5-$\mu$m thick transparent

EXAMPLE 6

80 parts by weight of chlorotrifluoroethylene, 12 parts by weight of ethylene, 16 parts by weight of vinyl acetate, 10 parts by weight of ethylvinylether, 250 parts by weight of xylene, 20 parts by weight of butylated melamine, 30 parts by weight of fine zinc oxide grains, and 10 parts by weight of fine titanium oxide grains were mixed by a paint shaker, and 170 parts by weight of xylene were added to the resultant mixture, thereby preparing a coating agent having a suitable viscosity and solid content. At this time, a mixing ratio of the fine grains to the binder was selected to be 112 parts by weight with respect to 100 parts by weight of the binder. This coating agent was sprayed on the outer surface of a glass tube of a fluorescent lamp (FL20S.N-SDL) and dried at 90° C. for 10 minutes, thereby forming a 2-$\mu$m thick transparent film.

EXAMPLE 7

50 parts by weight of soyabean oil aliphatic acid, 45 parts by weight of isophthalic acid, 30 parts by weight of glycerine, and 50 parts by weight of xylene were mixed in a reaction vessel and reacted in a nitrogen atmosphere at 200° C. 100 parts by weight of methylphenylsilicone were added to the resultant reaction product and reacted at 150° C. The resultant reaction product was diluted by xylene to adjust a nonvolatile content to be 50%. The resultant solution was used as a binder solution. 20 parts by weight of fine zinc oxide grains, 30 parts by weight of fine titanium oxide grains, and 160 parts by weight of toluene were mixed in 100 parts by weight of the binder solution, and the resultant mixture was dispersed by a sand grinder for one hour, thereby preparing a coating agent. At this time, a mixing ratio of the fine grains to the binder was selected to be 100 parts by weight of the fine grains with respect to 100 parts by weight of the binder. The resultant coating agent was sprayed on the outer surface of a glass tube of a fluorescent lamp (FL20S.N-SDL) and dried at 100° C.

for 15 minutes, thereby forming a 3-μm thick transparent film.

A fluorescent lamp (FL20S.N-SDL) (Comparative Example 1) having no ultraviolet absorbing film on neither the inner nor the outer surface of a glass tube and a fluorescent lamp (FL20S.N-SDL.NU) (Comparative Example 2) having two layers (thickness = 10 μm) of a titanium oxide layer and a fluorescent substance layer sequentially formed on the inner surface of a glass tube were used to be compared with the above fluorescent lamps according to the examples of the present invention.

The characteristics of the fluorescent lamps according to Examples 1 to 7 and Comparative Examples 1 and 2 are summarized in Table 1. In Table 1, Ra represents an color rendering index, and UV represents an ultraviolet radiation amount. The ultraviolet radiation amount was measured by using an ultraviolet intensity meter (UVR-365: available from TOKYO OPTICAL CO., LTD.) and setting a distance between a lamp and a light-receiving portion to be 30 cm. A symbol "—" in the column of UV represents that no ultraviolet radiation was detected by the ultraviolet intensity meter.

Figure 4:
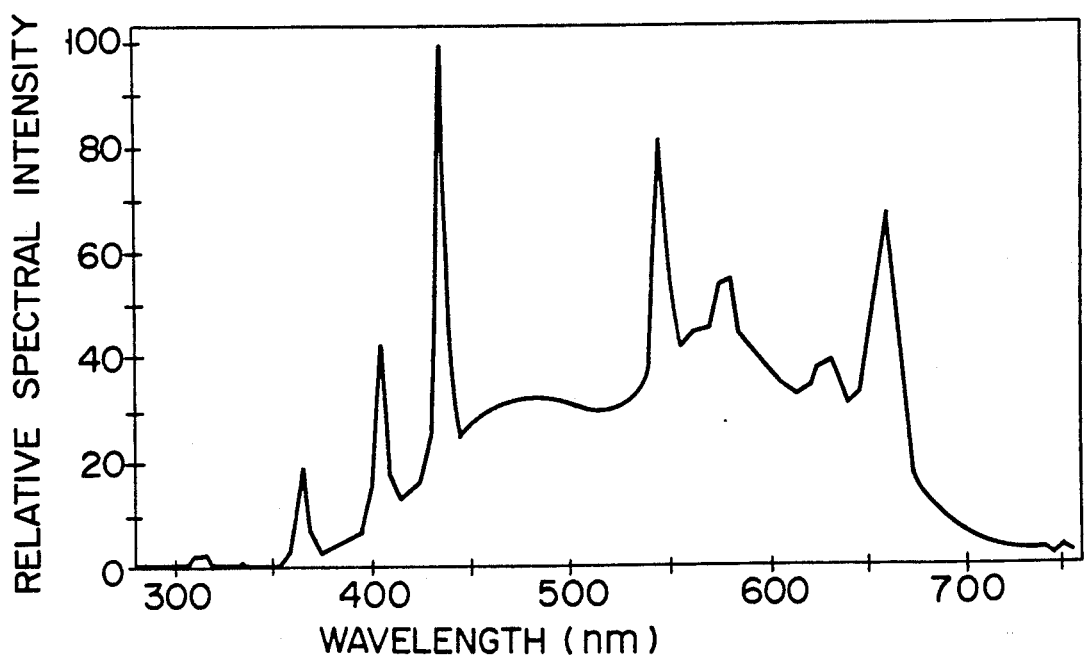
FIG. 4 is a graph showing a spectral energy distribution of a fluorescent lamp according to Comparative Example 1 in which no film containing an ultraviolet absorbent is formed.

FIGS. 1 to 5 show spectral energy distribution curves of the fluorescent lamps according to Examples 1, 3, and 5 and Comparative Examples 1 and 2, respectively.

tionship is present between a mixing ratio of the two materials, a total luminous flux of the lamp, and its ultraviolet absorptive power (spectral intensity of a 405-nm mercury resonance line). That is, as the mixing ratio of zinc oxide is increased, the total luminous flux is increased, but the ultraviolet absorptive power is reduced. On the contrary, as the mixing ratio of titanium oxide is increased, the ultraviolet absorptive power is increased, but the total luminous flux is reduced. Therefore, the mixing ratio between zinc oxide and titanium oxide is arbitrarily set in accordance with required characteristics of a lamp. This mixing ratio of zinc oxide:titanium oxide (weight ratio) is preferably 99:1 to 20:80, and most preferably, 95:5 to 50:50. If the mixing ratio falls outside this range, the film cannot satisfy the two requirements of shielding of ultraviolet radiation (wavelength = 400 nm or less) and a high transmittance with respect to visible light at the same time.

This relationship will be described in more detail below with reference to FIG. 6. Test pieces were manufactured as follows in order to conduct the test. That is, following the same procedures as in Example 1, zinc oxide and titanium oxide were mixed at mixing ratios of zinc oxide:titanium oxide (weight ratio) of (a) 90:10, (b) 50:50, (c) 30:70, and (d) 100:0 (i.e., only zinc oxide), thereby preparing coating agents. These coating agents were coated on glass plates identical to a glass plate for

TABLE 1

|  | 0 Hour | | | | 100 Hours | | 500 Hours | | 1000 Hours | |
| --- | --- | --- | --- | --- | --- | --- | --- | --- | --- | --- |
|  | Ra | Color Temperature (K.) | Total Luminous Flux (lm) | UV ($\mu W/cm^2$) | Total Luminous Flux (lm) | UV ($\mu W/cm^2$) | Total Luminous Flux (lm) | UV ($\mu W/cm^2$) | Total Luminous Flux (lm) | UV ($\mu W/cm^2$) |
| Example 1 | 92 | 5000 | 960 | — | 925 | — | 890 | — | 850 | — |
| Example 2 | 92 | 5000 | 955 | — | 925 | — | 885 | — | 840 | — |
| Example 3 | 92 | 5000 | 950 | — | 910 | — | 880 | — | 840 | — |
| Example 4 | 92 | 5000 | 955 | — | 920 | — | 885 | — | 845 | — |
| Example 5 | 92 | 5000 | 950 | — | 910 | — | 880 | — | 840 | — |
| Example 6 | 92 | 5000 | 955 | — | 915 | — | 875 | — | 845 | — |
| Example 7 | 92 | 5000 | 950 | — | 910 | — | 880 | — | 840 | — |
| Comparative Example 1 | 92 | 5000 | 950 | 15.5 | 910 | 14.0 | 875 | 12.5 | 840 | 12.0 |
| Comparative Example 2 | 91 | 5000 | 910 | — | 850 | — | 810 | — | 770 | — |

As is apparent from Table 1, the total luminous fluxes of the fluorescent lamps of Examples 1 to 7 are substantially the same as compared with that of the fluorescent lamp Comparative Example 1) having no film. In addition, as is apparent from a comparison of spectral intensities of 405-nm mercury resonance lines between the examples of the present invention shown in FIGS. 1 to 3 and the comparative example shown in FIG. 4, the fluorescent lamps according to the present invention can sufficiently suppress ultraviolet radiation. Note that almost no light color difference was found between the fluorescent lamps according to the present invention and the fluorescent lamp according to Comparative Example 1. Furthermore, as compared with the fluorescent lamp (Comparative Example 2) having the titanium oxide layer formed on the inner surface of the glass tube, the total luminous flux of each of the fluorescent lamps according to Examples 1 to 7 is significantly improved.

As is apparent from a comparison between Examples 1 and 3, when zinc oxide and titanium oxide are used as an ultraviolet absorbent, the following qualitative relause in a fluorescent lamp and dried to form films, thereby manufacturing four types of test pieces. FIG. 6 shows a transmittance of ultraviolet radiation and visible light near a wavelength of 400 nm for each of the four types of test pieces.

As is apparent from FIG. 6, each of the test pieces having the film formed by the coating agent (a), (b), or (c) according to the present invention has a significant shielding effect on ultraviolet radiation having a wavelength of 400 nm or less as compared with the test piece having a film formed by the coating agent (d) containing only zinc oxide.

The coating agents (a), (b), (c), and (d) were used to manufacture fluorescent lamps (FL20S.N-SDL) each having a 4-μm thick film, and their characteristics were checked. As a result, as compared with the lamps having films formed by the coating agents (a), (b), and (c), in the lamp having a film formed by the coating agent (d), an ultraviolet suppressing effect was unsatisfactory and almost no suppressing effect was found near a wavelength of 400 nm.

The coating agent (d) was used to manufacture lamps having film thicknesses of 10 μm, 30 μm, and 50 μm. As a result, an ultraviolet suppressing effect of each lamp was unsatisfactory, and in the lamp having a film thickness of 50 μm, adhesion strength of the film was poor, and the luminous flux was reduced.

Although the present invention has been described with reference to its preferred examples, various changes and improvements may be made for these examples without departing from the spirit and scope of the present invention.

What is claimed is:

1. An ultraviolet-suppressed light source, wherein a film consisting of a fine powder of zinc oxide and titanium oxide and a binder is formed on an outer surface of a glass tube constituting said light source.

2. A light source according to claim 1, wherein said light source is a fluorescent lamp.

3. A light source according to claim 1, wherein said light source is a halogen lamp.

4. A light source according to claim 1, wherein said light source is an HID lamp.

5. A light source according to claim 1, wherein said film has a film thickness of 0.1 to 100 μm.

6. A light source according to claim 1, wherein a weight ratio of zinc oxide:titanium oxide in said fine powder is 99:1 to 20:80.

7. A light source according to claim 1, wherein a grain size of said fine powder is not more than 0.1 μm.

8. A light source according to claim 1, wherein a mixing ratio of said fine powder to said binder is 10 to 900 parts by weight of said fine powder with respect to 100 parts by weight of said binder.

9. A light source according to claim 1, wherein said binder is selected from the group consisting of a butyral resin; an acrylic resin; a fluorine resin; a silicone resin; an alkali silicate such as soda silicate; an inorganic colloid such as silica sol and alumina sol; an alkyl silicate such as tetraethoxysilane; a phosphate such as aluminum phosphate; and an organic metal compound such as a metal alkoxide, aluminum chelate, and tin acetate.

10. A light source according to claim 4, wherein said binder is selected from the group consisting of a silicone resin; an alkali silicate such as soda silicate; an inorganic colloid such as silica sol and alumina sol; an alkyl silicate such as tetraethoxysilane; a phosphate such as aluminum phosphate; and an organic metal compound such as a metal alkoxide, aluminum chelate, and tin acetate.

11. A light source according to claim 1, wherein an overcoating layer is formed on said film.

12. A coating agent for an ultraviolet-suppressed light source, wherein a fine powder of zinc oxide and titanium oxide and a binder are dispersed in a solvent.

13. A coating agent according to claim 12, wherein a weight ratio of zinc oxide:titanium oxide in said fine powder is 99:1 to 20:80.

14. A coating agent according to claim 12, wherein a grain size of said powder is not more than 0.1 μm.

15. A coating agent according to claim 12, wherein a mixing ratio of said powder to said binder is 10 to 900 parts by weight of said powder to 100 parts by weight of said binder.

16. A coating agent according to claim 12, wherein said binder is selected from the group consisting of a butyral resin; an acrylic resin; a fluorine resin; a silicone resin; an alkali silicate such as soda silicate; an inorganic colloid such as silica sol and alumina sol; an alkyl silicate such as tetraethoxysilane; a phosphate such as aluminum phosphate; and an organic metal compound such as a metal alkoxide, aluminum chelate, and tin acetate.

17. A coating agent for high temperature according to claim 12, wherein said binder is selected from the group consisting of a silicone resin; an alkali silicate such as soda silicate; an inorganic colloid such as silica sol and alumina sol; an alkyl silicate such as tetraethoxysilane; a phosphate such as aluminum phosphate; and an organic metal compound such as a metal alkoxide, aluminum chelate, and tin acetate.

18. A coating agent according to claim 12, wherein a boiling point of said solvent is 60° C. to 200° C.

19. A coating agent according to claim 18, wherein said solvent is selected from the group consisting of an aromatic hydrocarbon such as xylene and toluene; an alcohol such as isopropylalcohol or n-butanol; an ester such as butyl acetate; a ketone such as methylisobutylketone; a glycol ether such as ethylcellosolve; and a saturated hydrocarbon such as n-hexane, ligroin, and mineral spirit.

20. A coating agent according to claim 12, wherein said coating agent contains small amounts of a surface treating agent, a dispersing agent, a lubricant, a drying agent, an anti-foaming agent, and/or a hardening agent.

21. A method of manufacturing an ultraviolet-suppressed light source, wherein a coating agent prepared by dispersing a fine powder of zinc oxide and titanium oxide and a binder in a solvent is coated on an outer surface of a glass tube constituting a light source and is dried.

22. A method according to claim 21, wherein said coating agent is coated by a brushing method, a spraying method, a dipping method, or a curtain flow coating method.

23. A method according to claim 21, wherein said drying is performed at not more than 200° C.

* * * * *